(12) United States Patent
Alfano et al.

(10) Patent No.: US 8,111,957 B2
(45) Date of Patent: Feb. 7, 2012

(54) +CYLINDRICAL POLARIZATION BEAMS

(75) Inventors: Robert R Alfano, Bronx, NY (US); Xin Chen, Corning, NY (US); Joohyun Koh, Painted Post, NY (US); Ming-Jun Li, Horseheads, NY (US); Daniel Aloysius Nolan, Corning, NY (US); Henry Sztul, New York, NY (US)

(73) Assignee: Corning Incorporated, Corning, NY (US)

( * ) Notice: Subject to any disclaimer, the term of this patent is extended or adjusted under 35 U.S.C. 154(b) by 61 days.

(21) Appl. No.: 12/498,591

(22) Filed: Jul. 7, 2009

(65) Prior Publication Data

US 2010/0142890 A1 Jun. 10, 2010

Related U.S. Application Data

(60) Provisional application No. 61/079,641, filed on Jul. 10, 2008, provisional application No. 61/118,097, filed on Nov. 26, 2008.

(51) Int. Cl.
*G02B 6/26* (2006.01)
*G01N 21/00* (2006.01)
(52) U.S. Cl. .................................. 385/28; 356/73.1
(58) Field of Classification Search .................. None
See application file for complete search history.

(56) References Cited

U.S. PATENT DOCUMENTS

| 4,697,876 | A | 10/1987 | Dyott |
| 4,915,468 | A | 4/1990 | Kim et al. |
| 5,298,047 | A | 3/1994 | Hart, Jr. et al. |
| 6,020,584 | A * | 2/2000 | Brarens et al. ........... 250/227.17 |
| 6,778,747 | B1 | 8/2004 | Bhagavatula et al. |
| 2004/0150811 | A1* | 8/2004 | Ingles et al. .................. 356/73.1 |
| 2009/0202191 | A1* | 8/2009 | Ramachandran ............... 385/11 |

OTHER PUBLICATIONS

Volpe, G. et al., "Generation of Cylindrical Vector Beams With Few-Mode Fibers Excited by Laguerre-Gaussian Beams", Optics Communications, 2004, vol. 237, pp. 89-95.
Alexeyev, C.N. et al., "Intensely Twisted Elliptic Optical Fibres Maintaining Propagation of a Single Optical Vortex", J. Opt. A: Pure Apple. Opt. 2006, vol. 8, pp. L5-L9.
Li et al.; "Fiber spin-profile designs for producing fibers with low polarization mode dispersion"; Optics Letters, vol. 23, No. 21, Nov. 1998.

* cited by examiner

*Primary Examiner* — Tina Wong
(74) *Attorney, Agent, or Firm* — Joseph M. Homa

(57) ABSTRACT

Generation of a cylindrically polarized light beam, and in particular, a hybrid-azimuthal-radial polarization beams, called HARP modes, generated from an input linearly polarized Gaussian beam using a spun optical waveguide device is taught. The HARP modes are comprised of hybrid-azimuthal polarization (HAP) and hybrid-radial polarization (HRP) superposition modes. These beams possess a non-zero local angular momentum density that is spatially varying and a zero total angular momentum.

22 Claims, 3 Drawing Sheets

Radial Polarization (a)

Azimuthal Polarization (b)

Hybrid Azimuthal Polarization (c)

$TE_{0.1}$ $+ i$ $HE_{2.1}$ $=$

Hybrid Azimuthal Polarization

+CYLINDRICAL POLARIZATION BEAMS

CROSS REFERENCE TO RELATED APPLICATIONS

This application claims the benefit of priority to U.S. Provisional Patent Application No. 61/079,641, filed Jul. 10, 2008 and U.S. Provisional Patent Application No. 61/118,097, filed Nov. 26, 2008.

BACKGROUND

A cylindrically polarized light beam, and including a hybrid-azimuthal and a radial hybrid polarization beam as well as radial and azimuthal polarization beams generated from an input linearly polarized Gaussian beam using a spun optical waveguide device called HARP modes.

Light beams having optical vortices are desirable for a number of important applications. These applications include, for example, optical imaging, lithography, electron particle acceleration, material processing, efficient laser cutting, welding, and metrology. Further, radially and azimuthally polarized light enables the focusing of beams beyond the diffraction limit while generating stationary longitudinal electric and magnetic fields.

The radially and/or azimuthally polarized light beams, referred to as cylindrical vector beams, may be generated using several different methods including, for example, intra-cavity polarization manipulation, computer generated holograms, offset input to few-mode optical fibers, and excitation of optical fibers with higher order modes. For applications like optical trapping, the radial polarized beam is able to trap the ambient medium, while the azimuthally polarized beam works to trap particles with dielectric constants lower than the ambient medium. Switching between radial and azimuthal polarization can be done, for example by using two half-wave plates.

While these methods have been devised to generate vector beams, these methods are complicated for they involve using few mode fibers in conjunction with a number of micro optic components such as an asymmetric phase plate, half wave plates and polarization controllers. For example, one would first convert an input Gaussian beam to an asymmetric beam using a phase plate and then use a number of polarization components to enable conversion to a cylindrical polarization mode.

It is well known that spinning an optical fiber can cause coupling between the two linear polarization modes of the first spatial mode of an optical fiber, i.e. the LP01 mode. See, for example, A. J. Barlow et. al. Applied Optics 20, 2961, (1981); U.S. Pat. No. 5,298,047; and M. J. Li and D A. Nolan Optics Letters, Vol. 23, No. 21, pgs. 1659-1661, (1998). These spinning techniques and technologies have been well studied for the purpose of reducing polarization mode dispersion in long length optical fiber transmission lines.

SUMMARY

The present invention describes a method for generating cylindrically polarized light, including what we term to be hybrid-azimuthal polarization mode and also a hybrid radial polarization mode, from an input linearly polarized Gaussian beam. The hybrid-azimuthal polarization mode is a combination of the azimuthal polarization mode and an HE21 mode. The hybrid radial polarization mode is also a combination of the radial polarization mode and an HE21 mode. The conversion takes place in a spun few mode optical waveguide device. The waveguide is a spun fiber waveguide of an appropriate index distribution to enable propagation of the linearly polarized $LP_{11}$ superposition of vortex—vector polarized modes. In addition the core may be slightly elliptical and the core center slightly offset from the geometric center of the device. Spinning the fiber during the drawing process causes these asymmetries to rotate along the device length at the spin frequencies. Spinning the device at a superposition of high frequencies on the order of centimeters and less causes light to couple from the input fundamental mode to the $LP_{11}$ mode, which is a superposition of the vortex vector modes. These modes include the $HE_{21}$, the radial and the azimuthal modes.

DETAILED DESCRIPTION

As has been described in G. Volpe, D. Petrov, *Generation Of Cylindrical Vector Beams With Few-Mode Fibers Excited By Laguerre-Gaussian Beams*, Opt. Commun 237 (2004) 89-95, and in other papers, cylindrical vector beams may be generated by exploiting the similarity between the polarization properties of the modes that propagate inside a step-index fiber and the cylindrical vector beam. A few-mode fiber supports the fundamental mode $LP_{01}$ ($HE_{11}$), in addition to the secondary modes $LP_{11}$ ($TE_{01}$, $TM_{01}$ and $HE_{21}$). The transverse electric, $TE_{01}$, $TM_{01}$ modes present, respectively, an azimuthally and radially polarized electric field, while the hybrid electric mode, $HE_{21}$, has a hybrid structure. However, the modal power distribution over the cross-section of the fiber is different for the modes $LP_{01}$ and $LP_{11}$. For $LP_{01}$ the power is concentrated in a small area around the axis of the fiber. By contrast, for $LP_{11}$ the power is distributed in a doughnut shape, for example, using a first order Laguerre-Gaussian $LG_{10}$ beam at the input of the fiber instead of a Gaussian beam.

The transverse electric fields of the four $LP_{11}$ modes, namely, $TE_{01}$, $TM_{01}$, $HE_{21}^{even}$, and $HE_{21}^{odd}$, is given as:

$$e_{TE} = F(r)\{\sin(\phi)\hat{x} - \cos(\phi)\hat{y}\}$$

$$e_{TM} = F(r)\{\cos(\phi)\hat{x} + \sin(\phi)\hat{y}\}$$

$$e_{HE}^{e} = F(r)\{\cos(\phi)\hat{x} - \sin(\phi)\hat{y}\}$$

Figure 1:
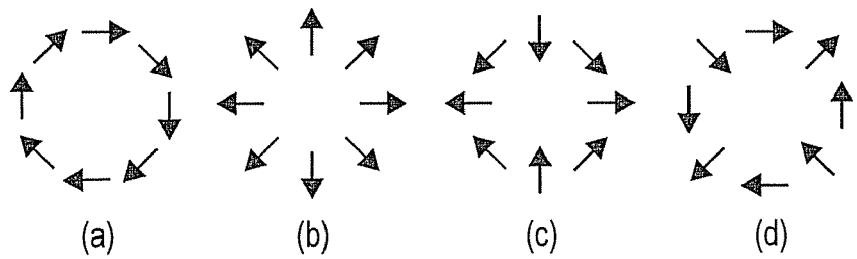
FIG. 1 is a color line depiction of the polarization patterns of the four $LP_{11}$ modes, as follows: (a) is the polarization pattern for the $TE_{01}$ mode, (b) is the polarization pattern for the $TM_{01}$ mode, (c) is the polarization pattern for the $HE_{21}^{even}$ mode, and (d) is the polarization pattern for the $HE_{21}^{odd}$ mode.

$e_{HE}{}^o = F(r)\{\sin(\emptyset)\hat{x} + \cos(\emptyset)\hat{y}\}$ where F(r) is a radial function and $\hat{x}$ and $\hat{y}$ are unit vectors. The polarization patterns of these various modes are shown in FIG. 1. The state of total field polarization varies along the fiber because there are three propagation constants for these modes, namely, $\beta_{HE}$ for even and odd $HE_{21}$ modes, $\beta_{TE}$ for the $TE_{01}$ mode, and $\beta_{TM}$ for the $TM_{01}$ mode.

Figure 2:
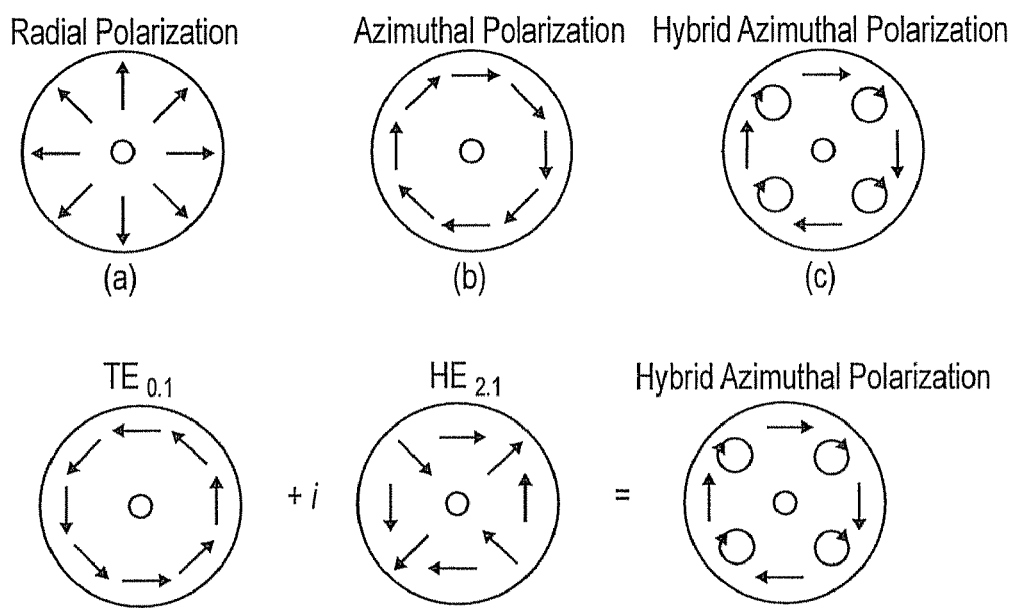
FIG. 2 is a color line depictions for the radial and azimuthal polarization states, and showing the hybrid azimuthal polarization state according to the invention.

As shown above, the general expression for the polarization state of a radially or azimuthally polarized beam is given by:

$$\epsilon = \begin{cases} a\sin(\emptyset)\hat{x} + b\cos(\emptyset)\hat{y} \\ a\sin(\emptyset)\hat{x} + b\cos(\emptyset)\hat{y} \end{cases} \quad [1]$$

respectively, where ø represents the angular position around the beam and a, b are coefficients allowing for circular or elliptical polarization states at some angles. With a=b=1, these two polarization states are shown in FIGS. 2(a) and (b), respectively. FIG. 2(c) shows the polarization state for:

$\epsilon = -a\sin(\emptyset)\hat{x} + b\cos(\emptyset)\hat{y}$ with a=1, and b=i.

This is a new polarization state that we describe herein as the hybrid-azimuthal polarization state (HAPs), according to the invention that has an orthogonal state we describe as the hybrid-radial polarization state (HRPs). The HAPs mode has a polarization similar to azimuthal polarization at ø=0, π/2, π, 3π/2, and polarization similar to circular polarization at ø=π/4, 3π/4, 5π/4, and 7π/4.

The HRPs mode has a polarization similar to radial polarization at ø=0, π/2, π, 3π/2, and polarization similar to circular polarization at ø=π/4, 3π/4, 5π/4, and 7π/4. The HAPs and HRPs modes form a class we are calling HARP modes.

The hybrid-azimuthal polarization can be written as a superposition of the transverse electric, $TE_{01}$, and the hybrid electric (even), $HE_{21}$ modes. The $TE_{01}$ is the same mode as the azimuthal polarization shown in both FIGS. 1(a) and 2(b). By contrast, the $HE_{21}$ mode is itself a hybrid mode and is shown in FIG. 1(d). By combining the $TE_{01}$ mode with the $HE_{21}$ mode at a given phase difference (i) as follows:

$TE_{01} + iHE_{21(even)}$ gives rise to the HAP state. The factor of "i" before the $HE_{21}$ mode represents a π-phase difference between the two polarization states, which is what is responsible for the circular polarization components in the final polarization.

Orthogonal to the HAP polarization is the hybrid radial polarization (HRP) mode. It is a superposition of the TM01 and the odd $HE_{21}$ mode $TM01 + iHE_{21(odd)}$ The linear and angular momentum of the HAPs and the HRP modes can be calculated following the methods of L. Allen, M. J. Padgett, M. Babiker, *Progress in Optics XXIX*, pp. 291-372 (1999). We consider in detail the HAP mode keeping in mind similar statements can be made concerning the HRP mode. As is shown from equation [1] above, the polarization state, c is a function of ø, and yet is shown with unit vectors $\hat{x}$ and $\hat{y}$. If rewritten as r and ø, we would not allow for the constants a and b, which are the terms responsible for the manifestation of the HAP state. Assuming the vector potential takes the form, $\vec{A}(r) = (\cos\phi\hat{x} - \sin\phi\hat{y})u(r)\exp[ikz]$, where $u(r) = u_o r \exp[-r^2]$, $\phi = \arctan(y/x)$ is the azimuthal position around the beam and $r = \sqrt{x^2 + y^2}$, the electric and magnetic fields calculated from the Lorenz gauge [10] are:

$$\vec{B}(\vec{r}) = -ik[(\sin\phi\hat{x} + i\cos\phi\hat{y})u(r) + (i/k)(\sin\phi d/dy + i\cos\phi d/dx)u(r)(z)] \quad [3]$$

and $$\vec{E}(\vec{r}) = -iw[(-\sin\phi\hat{x} + i\cos\phi\hat{y})u(r) + (i/k)(-\sin\phi d/dx + i\cos\phi d/dy)u(r)(z)] \quad [4]$$

Calculating the time averaged linear momentum, $\vec{p}$, using these fields $$\vec{p} = \frac{\epsilon}{2}[(\vec{E}^* \times \vec{B}) + (\vec{E} \times \vec{B}^*)] \quad [5]$$

$$= -\omega\epsilon\sin\phi(d/dx + d/dy)|u(r)|^2(-\hat{x} + \hat{y}) + \omega\epsilon k|u(r)|^2\hat{z}$$

From Eq. 5, the angular momentum density of the HAP state is calculated as, $$\vec{j}_z = [\vec{r} \times (\epsilon\vec{E} \times \vec{B})] \quad [6]$$

$$\propto \frac{1}{2\epsilon}\omega r\sin 2\phi(x(d/dx) + y(d/dy))|u|^2,$$

using the double angle identity, $\sin\phi\cos\phi = (½)\sin 2\phi$. Comparing this to the angular momentum calculated for a circularly polarized beam of light, we see that the "σ", known as the spin angular momentum of a photon, that had a value of ±1 depending on the handedness of the circularly polarized light and 0 for linearly polarized light, now takes the spatially varying value of $\sin 2\phi$. This φ-dependence implies that locally, the angular momentum varies from 0 at φ=0 to +ℏ at φ=π/4 to 0 at φ=π/2 to −ℏ at φ=3π/2 and so on. Wherever there is a circular polarization in FIG. 1(c), the angular momentum is ±ℏ. Calculating the total angular momentum by integrating across the beam gives:

$J_z = \iint r dr d\phi j_z = 0$, [7]

as the integral over φ of $j_z$ in Eq. 7 from 0 to 2π is zero. So, while the spatial variation in the angular momentum density for the hybrid polarization is non-zero, the total angular momentum is in fact, zero. This differs from the angular momentum from the cases of pure radial or azimuthally polarized light as the angular momentum density for both of these modes is zero, i.e. $j_z^{radial} = 0$ and $j_z^{azimuthal} = 0$.

Experiments and Data

In order to cause coupling from one polarization mode of the $LP_{01}$ spatial mode to another it is required that the spin rate be sufficiently faster than the beat length of the fiber. The beat length is inversely related to the ellipticity of the fiber core. The beat length is also related to the difference in propagation constants or effective indices of the two linearly polarized modes in a slightly elliptical core fiber.

Now the $LP_{11}$ mode is a superposition of the $HE_{21}$ mode as well as a radial and azimuthally polarization modes. These modes all have different propagation constants; see for example Vassallo, *Optical Waveguide Concepts*, Elsevier, 1991. The propagation constants or indices of these modes are all slightly different. Spinning a fiber can cause coupling among all these modes.

Figure 3:
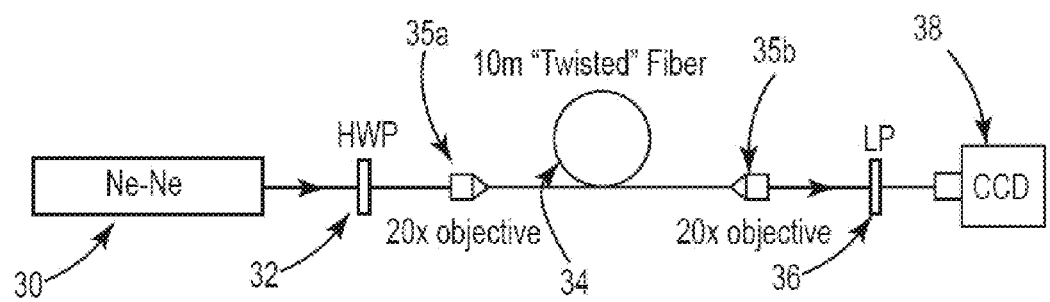
FIG. 3 illustrates an experimental arrangement to generate and analyze the cylindrical vector beams.

The experimental setup to generate a vortex beam with the HAP state is shown in FIG. 3. A vertically (linearly) polarized HE-NE (helium-neon) laser 30 with a wavelength of 632.8 nm passes through a half-wave plate 32 to create a linearly polarized Gaussian beam that may be rotated to a desirable orientation. The linearly polarized Gaussian beam is then coupled into a spun fiber 34 via a 20× microscope objective 35(a), which serves to focus the beam onto the core of the fiber. The output from the fiber is decoupled through a second 20× microscope objective 35(b), which serves to expand the output mode to a beam. The beam is then passed through a linear polarizer 36 that acts as an analyzer to characterize the output polarization state. The intensity distribution is recorded on a black and white CCD camera 38.

Although a vertically polarized He—Ne laser 30 is described as the source for generating a linearly polarized Gaussian beam, it is clear to one skilled in the art that any source for generating the linearly polarized Gaussian beam may be used. However, the source is preferably such that, once input into the fiber, the light propagates as an $LP_{11}$ mode. In the experiment described in FIG. 3, the elliptical core fiber 34 is spun at a rate of 20 turns per meter as it is made. However, the rate of twisting the fiber 34 may vary depending upon the ellipticity of the fiber and the length of the fiber in which one desires the conversion to occur. For example, a cylindrical fiber could theoretically be rotated at a lower rate, but preferably greater than 10 turns per meter. However, by using an elliptical core fiber, one could create the same mode-coupling effect at higher rotation rates.

Further, the length of the spun fiber 34 used in this experiment is approximately ten meters long. However, the length of the fiber may vary from a few centimeters to any desirable length, provided that the fiber is sufficiently long to allow the mode conversion to occur. As we reduce the length of the fiber, then we would need to increase the spin rate of the spun fiber, for a given ellipticity. Further, the experiment of FIG. 3 describes a fiber having a cutoff wavelength of 740 nm. However, in order to generate the $LP_{11}$ modes, all that is required is that the cutoff wavelength be greater than the wavelength of the light propagating in the fiber. Since a laser 30 with a wavelength of 632.8 nm was used, a spun fiber having a wavelength cutoff of 740 nm was acceptable. However, it is preferred that the wavelength cutoff not be so great as to allow the propagation of HE modes of higher order than the $HE_{31}$ mode. According to the experiment described in FIG. 3, the spun fiber 34 has a one percent (1%) core delta and a core diameter of a few microns, resulting in the appropriate cutoff wavelength. As has just been described, a fiber having various combinations of core delta and core diameter may be used provided that the appropriate cutoff wavelength is achieved.

In the experiment described in FIG. 3, the spun core of the spun fiber is slightly elliptical. Although a cylindrical core may be used, the ellipticity, as the orientation of the ellipse rotates, enables superior coupling to and from the differing polarized modes. It is preferred that the ellipticity of the core of the spun fiber has an eccentricity of greater than five percent. The spun fiber used in the experiments further had a core center that is slightly offset from the geometric center of the fiber cladding. This offset enables the spatial mode distribution to change from the symmetric Gaussian mode to an asymmetric Laguerre-Gaussian mode. Preferably, the core center is offset from the geometric center of the fiber by at least ten percent of the core diameter.

Figure 4:
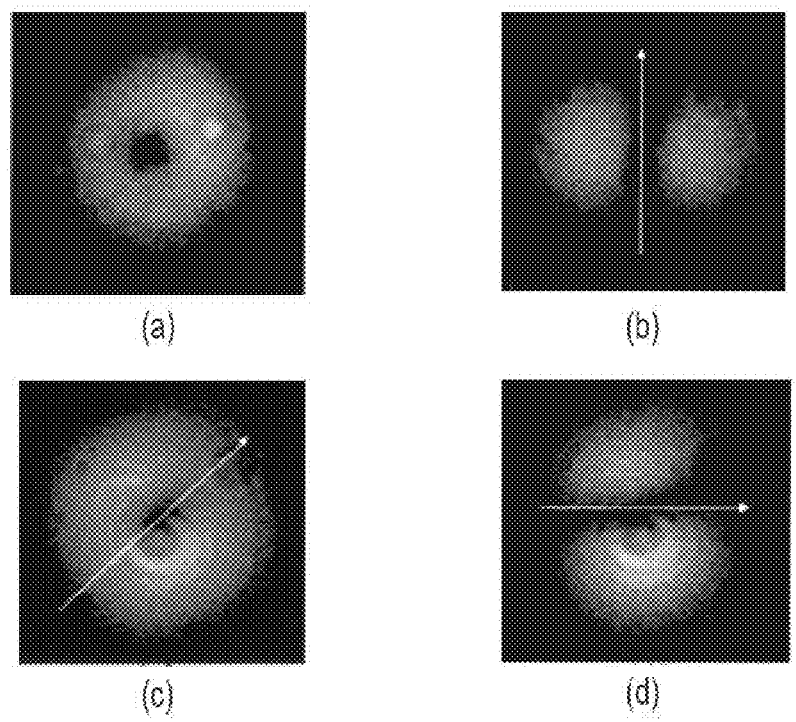
FIG. 4 illustrates the output of a spun fiber and the intensities that are seen after passing the output of the fiber through a linear polarizer set at (a) 0°, (b) 45°, and (c) 90°.

A typical output from the spun fiber 34 with a linear input polarization passing through the linear polarizer 36 is shown in FIG. 4. The figure shows the vector state of the collimated output from the spun fiber 34 when the analyzer polarization is set at (a) 0°, (b) 45°, and (c) 90°, respectively. When the analyzer is set to 0° or 90° the intensity pattern resembles a first-order Hermite-Gaussian mode and when the analyzer is set to 45° the intensity distribution resembles a first-order Laguerre-Gaussian mode. This spun fiber 34 is effectively acting as a mode converter, transforming a zero-order mode into a first-order mode. The orientation of the incident polarization does not destroy the HAPs output from the spun fiber 34.

In order to calculate the spin rates required for conversion of light among the $LP_{11}$ modes, one first needs to calculate the polarization corrections to the $LP_{11}$ mode [4], for these vector modes, i.e. the $HE_{21}$, TM and TE modes. When the spin rate proceeds at a rate equivalent to the difference between two of these vector modes, light will rapidly and completely transfer from one of these vector modes to the other.

TABLE 1

Dependence of spin rate of the fiber on output intensity and polarization.

| Spin Rate | Output Intensity | Output Polarization |
| --- | --- | --- |
| 0 turns/meter | $HG_{10}$ or $HG_{01}$ | Linear |
| 10 turns/meter | Almost vortex | Slight Superposition |
| 20 turns/meter | Vortex | Total Superposition (linear + azimuthal) = HAPs |

Figure 5:
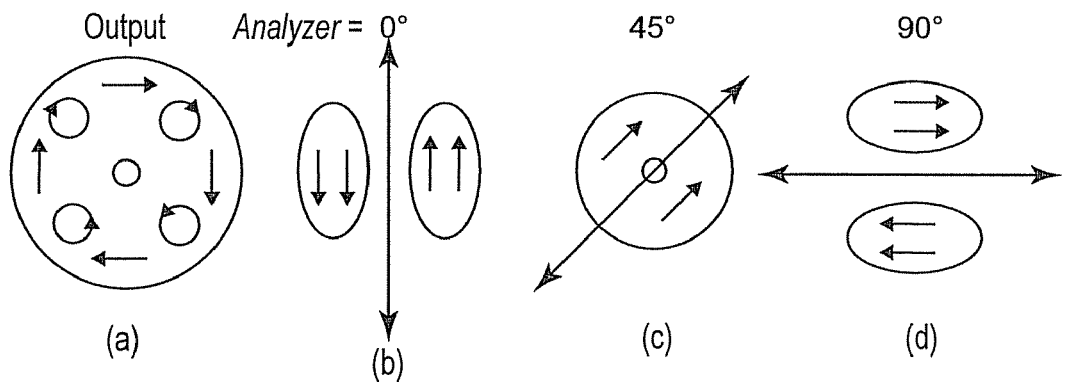
FIG. 5 illustrates a line depiction of the output polarization state from a spun fiber (a), and the intensity and polarization states when the output is passed through a linear polarizer set at (b) 0°, (c) 45°, and (d) 90°.

The dependence of the spin rate on the output state of the spun fiber 34 is shown in Table 1. In general, although this invention would cover a spun fiber waveguide device that is cylindrical, it is preferred to use a slightly elliptical waveguide having a core center slightly offset from the geometric center of the device. Given this configuration, spinning the fiber during the fiber drawing process causes the asymmetries to rotate along the length of the fiber at the spin frequency. Accordingly, when light is coupled into a fiber with the same cutoff wavelength and indices of refraction in not spin, i.e. a spin rate of 0 turns per meter, no vortex is seen. Rather, a Hermite-Gaussian mode is seen that is linearly polarized. Referring to FIG. 5, the output of an un-spun fiber has a HG mode structure like FIG. 5(b) or (d). Depending upon the alignment of the coupling into the fiber, the output is either a $HG_{10}$ or a $HG_{01}$, mode. FIGS. 5(b-d) show schematically what the polarization states are after passing through a linear polarizer set at set at (b) 0°, (c) 45°, and (d) 90°.

However, when light is coupled into a fiber with a spin rate of 10 turns per meter, the output starts to show signs of conversion to a cylindrical vector mode that has an optical vortex, and looks like a blend between a vortex and a HG mode, where the polarization is not quite linear and not quite the hybrid-azimuthal polarization.

Figure 6:
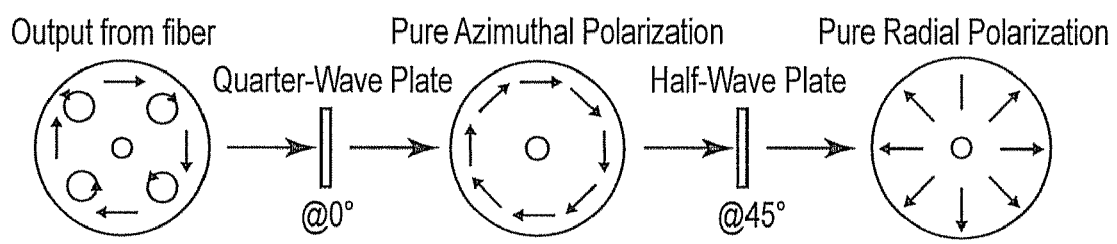
FIG. 6 illustrates the conversion of the output from the spun fiber to a pure azimuthally polarized beam using a quarter wave plate oriented at 0° or 90°.

When light is coupled into a fiber with a spin rate of 20 turns per meter shows complete conversion to the HE mode, as depicted by the line schematic in FIG. 5(a) and by the polarizer output depiction of FIG. 4(a). As shown, the output of the spun fiber is an optical vortex that is in a vector superposition state composed of linear and circular polarization states. Hence the HAP state is shown to have been created. Accordingly, The cylindrical vector beam shown and described in FIGS. 4 and 5 is the experimental observation of the hybrid-azimuthal polarization with circular polarization states every 90° around the beam profile. Referring now to FIG. 6, the hybrid-azimuthal beam can be transformed into a pure azimuthal polarization state by inserting a quarter-wave plate oriented at 0° or 90°. This will transform the regions of circular polarization into linear polarization states oriented at 45° or 135° depending on the handedness of the circular polarization and not affect the linear polarization states. This beam can be converted further to a pure radially polarized mode by inserting a half-wave plate oriented at 45° in the path of the beam, as shown in FIG. 6.

Further, it was found experimentally that fiber spinning during the drawing process can cause light to couple to the hybrid azimuthal polarization mode rather than the azimuthal polarization mode directly. This results because the hybrid is a combination of the $HE_{21}$ mode and the azimuthal mode, making it more likely that both modes be occupied rather than one mode alone.

What has been described above includes exemplary implementations of the present invention. It is, of course, not possible to describe every combination of components or methodologies for purposed of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A spun optical fiber comprising a fiber core and a fiber cladding, wherein:
   the core and cladding define a refractive index distribution of core diameter and core delta that enables propagation of a fundamental $LP_{01}$ propagation mode and secondary $LP_{11}$ propagation modes;
   the core diameter and core delta of the spun optical fiber are such that (i) polarization of the fundamental $LP_{01}$ propagation mode is a hybrid electric polarization $HE_{11}$, (ii) the respective polarizations of the secondary $LP_{11}$ propagation modes comprise transverse electric and hybrid electric modes, (iii) the transverse electric modes of the secondary $LP_{11}$ propagation modes comprise azimuthal $TE_{01}$ or radial $TM_{01}$ polarizations, and (iv) the hybrid electric mode of the secondary $LP_{11}$ propagation modes comprises a hybrid polarization $HE_{21}$; and
   the spun optical fiber is characterized by a spin rate that is sufficient to cause coupling among the azimuthal $TE_{01}$, radial $TM_{01}$, and hybrid $HE_{21}$ polarizations of the secondary propagation modes to yield a hybrid-azimuthal polarization state (HAP) and a hybrid-radial polarization state (HRP) orthogonal to the HAP.

2. The spun optical fiber of claim 1, wherein the HAP has a polarization similar to (a) azimuthal polarization at $\phi=0$, $\pi/2, \pi, 3\pi/2$, and (b) circular polarization at $\phi=\pi/4, 3\pi/4, 5\pi/4$, and $7\pi/4$, where $\phi$ represents angular position around the fiber core.

3. The spun optical fiber of claim 1, wherein the HRP has a polarization similar to (a) radial polarization at $\phi=0, \pi/2, \pi, 3\pi/2$, and (b) circular polarization at $\phi=\pi/4, 3\pi/4, 5\pi/4$, and $7\pi/4$, where $\phi$ represents angular position around the fiber core, when the input polarization is rotated by 90 degrees.

4. The spun optical fiber of claim 1, wherein the HAP has a polarization given by the equation $TE_{01}+iHE_{21}$, where $TE_{01}$ is the transverse electric mode, and $HE_{21}$ represents the hybrid electric modes, and i represents a $\pi$-phase difference between the two polarization states $TE_{01}$ and $HE_{21}$.

5. The spun optical fiber of claim 1, wherein the HAP has a polarization given by the equation $TE_{01}+iHE_{21}$, where $TE_{01}$ is the transverse electric mode, and $HE_{21}$ represents the hybrid electric modes, and i represents a $\pi$-phase difference between the two polarization states $TE_{01}$ and $HE_{21}$.

6. Spun optical fiber of claim 1, wherein the $HE_{21}$ mode is itself a hybrid mode.

7. The spun optical fiber of claim 1, wherein the core of the spun fiber is elliptical.

8. The spun optical fiber of claim 7, wherein the ellipticity of the core of the spun fiber has an eccentricity of greater than five percent.

9. The spun optical fiber of claim 1, wherein the spun fiber length is greater than five centimeters.

10. The spun optical fiber of claim 1, wherein the spun fiber has a core diameter and a core delta, such that the core enables the propagation of $TE_{01}$ and $HE_{21}$ modes, but not HE modes of higher order than an $HE_{31}$ mode.

11. The spun optical fiber of claim 1 wherein the spun fiber has a core center and a geometric center, such that the core center is offset from the geometric center of the fiber.

12. The spun optical fiber of claim 11, wherein the core center is offset from the geometric center of the fiber by at least ten percent of the core diameter.

13. The spun optical fiber of claim 1, wherein the spun fiber length is between five centimeters and 50 centimeters.

14. The spun optical fiber of claim 1 wherein the HAP is a superposition of the azimuthal $TE_{01}$ polarization state and an even component of the hybrid polarization $HE_{21}$ state.

15. The spun optical fiber of claim 1 wherein the HRP is a superposition of the radial $TM_{01}$ polarization state and an odd component of the hybrid polarization $HE_{21}$ state.

16. The spun optical fiber of claim 1 wherein the spun optical fiber is characterized by a spin rate that is equivalent to a difference between the azimuthal $TE_{01}$, radial $TM_{01}$, or hybrid $HE_{21}$ polarizations to enable propagating light to transfer from one of the polarizations to another.

17. The spun optical fiber of claim 1 wherein the spin rate of the spun optical fiber exceeds a beat length of the spun optical fiber.

18. The spun optical fiber of claim 1 wherein the core diameter and core delta of the spun optical fiber defines a cutoff wavelength that does not permit propagation of hybrid electric polarization modes of higher order than $HE_{31}$ mode.

19. The spun optical fiber of claim 1 wherein:
   the core of the spun optical fiber is characterized by an elliptical eccentricity of greater than five percent;
   the spun optical fiber has a core center and a geometric center of the fiber cladding; and
   the core center is offset from the geometric center of the fiber cladding by at least ten percent of the core diameter.

20. An optical fiber comprising a fiber core and a fiber cladding, wherein:
   the fiber comprises a spun optical fiber characterized by a spin frequency causing rotational asymmetries along a length of the fiber;
   the core of the spun optical fiber is characterized by an elliptical eccentricity of greater than five percent;
   the spun optical fiber has a core center and a geometric center of the fiber cladding; and
   the core center is offset from the geometric center of the fiber cladding by at least ten percent of the core diameter.

21. The spun optical fiber of claim 20 wherein the spin rate of the spun optical fiber exceeds a beat length of the spun optical fiber.

22. The spun optical fiber of claim 20 wherein the core diameter and core delta of the spun optical fiber defines a cutoff wavelength that does not permit propagation of hybrid electric polarization modes of higher order than $HE_{31}$ mode.

* * * * *